(No Model.)

G. M. ANDERSSON.
CENTRIFUGAL MACHINE.

No. 555,552. Patented Mar. 3, 1896.

Witnesses:
Edwin Seger.
Nicholas M. Goodlett Jr.

Inventor:
Gustaf M. Andersson
by Witter & Kenyon
his Attorneys.

UNITED STATES PATENT OFFICE.

GUSTAF M. ANDERSSON, OF NEWARK, NEW JERSEY, ASSIGNOR TO THE UNITED STATES BUTTER EXTRACTOR COMPANY, OF SAME PLACE.

CENTRIFUGAL MACHINE.

SPECIFICATION forming part of Letters Patent No. 555,552, dated March 3, 1896.

Application filed February 7, 1894. Serial No. 499,362. (No model.)

*To all whom it may concern:*

Be it known that I, GUSTAF M. ANDERSSON, a subject of the King of Sweden and Norway, and a resident of Newark, in the county of Essex and State of New Jersey, have invented a new and useful Improvement in Centrifugal Machines, of which the following is a specification.

My improvement relates to centrifugal separating-machines, and has for its object to provide a separator more rapid, efficient and thorough in operation than those heretofore in use.

It consists of the devices hereinafter described and claimed in the claims at the end of this specification.

The drawings represent the preferred form of my improved device, in which corresponding letters of reference indicate similar parts in both figures.

Figure 1:
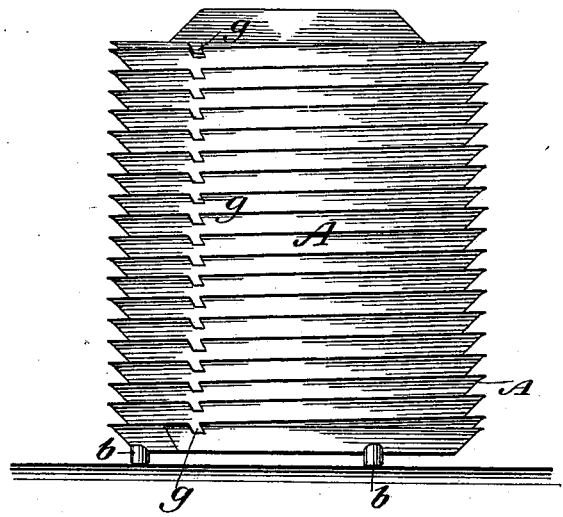
Figure 2:
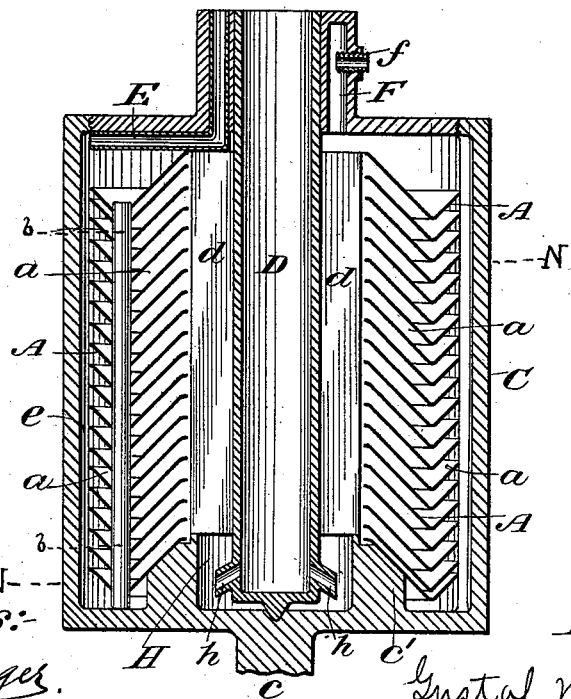

Figure 1 is a side elevation of my improved spiral, and Fig. 2 is a vertical section through the center of the bowl.

I have shown in the drawings and will now proceed to describe my improvement as embodied in a centrifugal cream-separator; but it is evident that my invention is adapted to be used in any centrifugal separating-machine.

A is a hollow spiral. It is preferably made of a ribbon of suitable material—as, for instance, tin—with a bend, angle or crease running longitudinally or in the direction of the length of the ribbon, the ribbon being coiled spirally so as to form a hollow cylinder. The walls of this cylinder are composed of the spirally-coiled ribbon. The different edges or rings of the spiral are kept at the proper distance apart from each other by the supports *b b*, thus forming spiral passage-ways *a a*. The spiral A is preferably made in one piece. It is placed within the bowl of the cream-separator. As shown in the drawings, the lower ends of the supports *b b* form its feet, which rest upon the floor of the bowl N, and the inner lower surface of the lowest ring of the spiral rests upon the inclined surface of the cup H. The spiral A is secured within the bowl in any suitable manner, so as to revolve with the bowl. As shown, grooves *g* are cut in the spiral, into which take corresponding projections from the inner wall of the bowl. By means of these projections a space is maintained between the spiral A and the inner wall of the bowl. In practice I prefer to make the spiral A so that it can be detached and removed from the bowl for cleaning or other purposes.

D is the inlet-pipe for supplying milk. Between it and the inner faces of the rings is a cylindrical space through which the milk passes to the different passage-ways *a a* of the spiral and through which the separated cream passes to the cream-outlet *f*. In this space I mount radial blades or wings *d d* adapted to rotate with the bowl to give rotation to the milk. These wings may be made, if desired, to extend down into the cup. As shown in the drawings, the wings *d d* are made integral with the inlet-pipe D, both inlet-pipe and wings revolving with the bowl.

A space F at the top of the bowl permits the separated cream to escape to the cream-outlet *f*.

E forms the outlet for the blue milk.

The other parts of the cream-separator are not shown, as they do not form a part of my invention.

The operation of my device is as follows: The milk is introduced in the usual way through the inlet-pipe D, passes out into the cup H and over its upper edge into the central cylindrical space within the inner edges of the spiral A. Here rotation is given to it by the radial blades *d d*. From this space it passes into the passage-ways *a a* in the spiral. In these passages the blue milk and cream are in the well-known way separated from each other by the centrifugal force exerted by the rapid rotation of the bowl, the blue milk tending outward and toward the periphery of the bowl, the cream tending inward and toward the central space. As the milk, cream, and blue or skim milk always rotate less rapidly than the bowl itself, and as the bowl, as is usual in centrifugal cream-separators, rotates in the same direction as that of the hands of a watch, the effect of the spiral upon the cream and blue milk, while they are within the passage-ways *a a*, is to give them a spiral upward course, the blue milk tending outward and spirally upward, the cream inward and spirally upward. A very rapid and thorough separation of the cream and the blue milk from each other takes place within the spiral passage-ways $a\ a$. The blue milk after reaching the outer ends of these passage-ways $a\ a$ passes up through the surrounding space between the inner wall of the bowl and the outer edges of the spiral A and escapes through the outlet E in the usual manner. The cream meanwhile, after reaching the inner ends of the passage-ways $a\ a$, passes upward into the space F and out through the outlet $f$ in the usual manner.

By means of my improved device the separating capacity of a centrifugal cream-separator is largely increased, while at the same time a larger percentage of cream is obtained. The work of separation is done more rapidly and more thoroughly. The spiral can be quickly removed from the bowl and the parts can easily be cleansed.

In my preferred form the milk is introduced at the bottom of the bowl. The spiral is so arranged that when the bowl rotates the milk, cream, and blue milk within the spiral tend upward and both blue milk and cream are discharged at the top; but these conditions could, if desired, and without departing from my invention, be reversed.

The longitudinal bend or fold in the spirally-coiled ribbon may be sharp or angular, as shown in the drawings, or curving or wavy, if desired. Likewise, if desired, more than one bend or fold may be made in the ribbon. The advantage of such folds or bends is that their edges form meeting places or junctions where the inflowing cream and the outflowing blue milk strike against and cross through each other, and thus the more thoroughly extract the butter-fat from the milk. My improved spiral increases the efficiency of such a construction.

What I claim as new, and desire to secure by Letters Patent, is—

1. The combination with the bowl of a centrifugal separating-machine, of a ribbon of suitable material having one or more angles or bends running in the direction of the length of said ribbon and coiled to form a spiral within the bowl of said machine, so as to form a spiral passage-way for the fluid fed to the machine, and wings mounted in the space inside of said spiral and adapted to rotate with the bowl, substantially as set forth.

2. The combination with the bowl of a centrifugal separating-machine, of a hollow cylindrical body mounted in the bowl of said machine composed of a ribbon of suitable material having a longitudinal crease or bend, and coiled spirally to form spiral passage-ways for the fluid being operated upon, supporting-bars to keep the edges of the spiral the proper distance apart, and wings mounted within the hollow space inside said cylindrical body and adapted to rotate with the bowl, substantially as set forth.

3. The combination with the bowl of a centrifugal separating-machine, of a hollow cylindrical body mounted in the bowl of said machine composed of a ribbon of suitable material having a longitudinal crease or bend, and coiled spirally to form spiral passage-ways for the fluid being operated upon, supporting-bars to keep the edges of the spiral the proper distance apart, wings mounted within the hollow space inside said cylindrical body and adapted to rotate with the bowl, an inlet for the admission of fluid into the bowl, space between the spiral and the inside walls of the bowl for the escape of the heavier parts of the liquid from the spiral, and outlets at the opposite end from the inlet for the discharge of the lighter and heavier portions of the fluid, substantially as set forth.

4. In a centrifugal cream-separator, the spiral ribbon A detachably mounted within the bowl being smaller in diameter than the entire diameter of the interior of the bowl so as to leave a space $e$ surrounding it for the escape of blue milk and having a longitudinal bend or fold, and spiral passage-ways $a$ for the blue milk and cream, rods $b$, inlet-pipe D, outlet-pipe E for the discharge of blue milk and outlet-pipe $f$ for the discharge of cream, and wings $d$ adapted to rotate with the bowl, substantially as set forth.

In testimony whereof I have signed my name to this specification in the presence of two subscribing witnesses.

GUSTAF M. ANDERSSON.

Witnesses:
HENNING G. TAUBE,
LOUIS C. TIEMROTH.